United States Patent
Li et al.

(10) Patent No.: US 9,366,171 B2
(45) Date of Patent: Jun. 14, 2016

(54) METHOD FOR DETERMINING AN ESTIMATED AMOUNT OF SOOT ACCUMULATED IN A PARTICULATE FILTER OF AN EXHAUST GAS AFTER-TREATMENT SYSTEM

(71) Applicant: GM GLOBAL TECHNOLOGY OPERATIONS LLC, Detroit, MI (US)

(72) Inventors: Jianwen Li, West Bloomfield, MI (US); Rahul Mital, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 148 days.

(21) Appl. No.: 14/153,449

(22) Filed: Jan. 13, 2014

(65) Prior Publication Data
US 2015/0198076 A1  Jul. 16, 2015

(51) Int. Cl.
*F01N 3/00* (2006.01)
*F01N 9/00* (2006.01)
*F01N 3/10* (2006.01)
*F01N 3/20* (2006.01)
*F01N 3/035* (2006.01)
*F01N 11/00* (2006.01)

(52) U.S. Cl.
CPC .............. *F01N 9/002* (2013.01); *F01N 3/106* (2013.01); *F01N 3/2066* (2013.01); *F01N 3/035* (2013.01); *F01N 11/002* (2013.01); *F01N 2550/04* (2013.01); *F01N 2900/1606* (2013.01)

(58) Field of Classification Search
CPC .................... F02D 41/1467; F01N 2900/1606; F01N 2900/1411
USPC .............................. 60/295, 299, 297, 301, 275
See application file for complete search history.

(56) References Cited

U.S. PATENT DOCUMENTS

| 2004/0103881 | A1* | 6/2004 | Chen et al. ..................... 123/357 |
| 2008/0078236 | A1* | 4/2008 | Mital et al. ......................... 73/38 |
| 2009/0071129 | A1* | 3/2009 | Gonze et al. ..................... 60/286 |
| 2011/0023467 | A1* | 2/2011 | Kong et al. ..................... 60/287 |
| 2011/0146244 | A1* | 6/2011 | Farman et al. .................. 60/285 |

* cited by examiner

Primary Examiner — Audrey K Bradley
Assistant Examiner — Anthony Ayala Delgado
(74) Attorney, Agent, or Firm — Quinn Law Group, PLLC (57) ABSTRACT

A method for estimating the amount of soot accumulated in a particulate filter of a vehicle exhaust gas system is provided. The system may include an engine, an exhaust gas system, having a particulate filter, and a controller configured to execute the present method. The controller may be configured to evaluate an instantaneous volumetric flow rate of an exhaust gas flowing through the exhaust gas system; monitor an exhaust gas pressure drop across the particulate filter; determine a drive state of the vehicle based on the instantaneous volumetric flow rate of exhaust gas and the exhaust gas pressure drop; and execute one of a first control action when the drive state is a steady-state drive state and a second control action when the drive state is a transient-state drive state.

11 Claims, 3 Drawing Sheets

METHOD FOR DETERMINING AN ESTIMATED AMOUNT OF SOOT ACCUMULATED IN A PARTICULATE FILTER OF AN EXHAUST GAS AFTER-TREATMENT SYSTEM

TECHNICAL FIELD

The present teachings include a method for determining an estimated amount of soot accumulated in a particulate filter of an exhaust gas system in each of a transient-state drive state and a steady-state drive state.

BACKGROUND

An exhaust gas after-treatment system for a modern diesel engine exhaust system typically incorporates a particulate filter for collecting and disposing of sooty particulate matter. A typical particulate filter acts as a trap for removing the particulate matter from the exhaust gas system. In many instances, the particulate filter may be regenerated or cleaned using superheated exhaust gas to burn off the collected particulate.

The pressure drop across the particulate filter may ordinarily be a good proxy for accumulated soot therein in steady-state or highway driving conditions. In other drive cycles, such as stop-and-go cycles and other transient conditions, it is more difficult to estimate an amount of soot accumulated in the particulate filter via a strict resistance flow or exhaust gas pressure drop calculation across the particulate filter due to a changing volumetric flow rate of the exhaust gas passing through the exhaust gas system.

SUMMARY

A method for estimating the amount of soot accumulated in a particulate filter of a vehicle exhaust gas system is provided. The system may include a soot producing engine of a vehicle that generates an exhaust stream. The system may further include an exhaust gas system in fluid communication with the engine, wherein the exhaust gas system includes a plurality of exhaust after-treatment devices configured to catalytically convert nitrogen oxide ($NO_x$) gases present in the exhaust stream into water and nitrogen and remove particulate matter from the exhaust stream. The after-treatment devices may include a particulate filter. The system may further include a controller having a processor and tangible, non-transitory memory on which is recorded instructions. In executing the recorded instructions written on the non-transitory memory of the controller, the processor may execute the steps of the present method of estimating the amount of soot accumulated in the particulate filter of the exhaust gas system.

The controller may be configured to execute the present method through the following example steps. The controller will first evaluate an instantaneous volumetric flow rate of an exhaust gas flowing through the exhaust gas system. The controller will then monitor an exhaust gas pressure drop across the particulate filter. The controller will subsequently determine a drive state of the vehicle based on the instantaneous volumetric flow rate of exhaust gas and the exhaust gas pressure drop, wherein the drive state is one of a steady-state drive state and a transient-state drive state. Upon determining the drive state, the controller will execute one of a first control action when the drive state is a steady-state drive state and a second control action when the drive state is a transient-state drive state to estimate the amount of soot accumulated in the particulate filter and ultimately determine the need for a regeneration event of the particulate filter.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
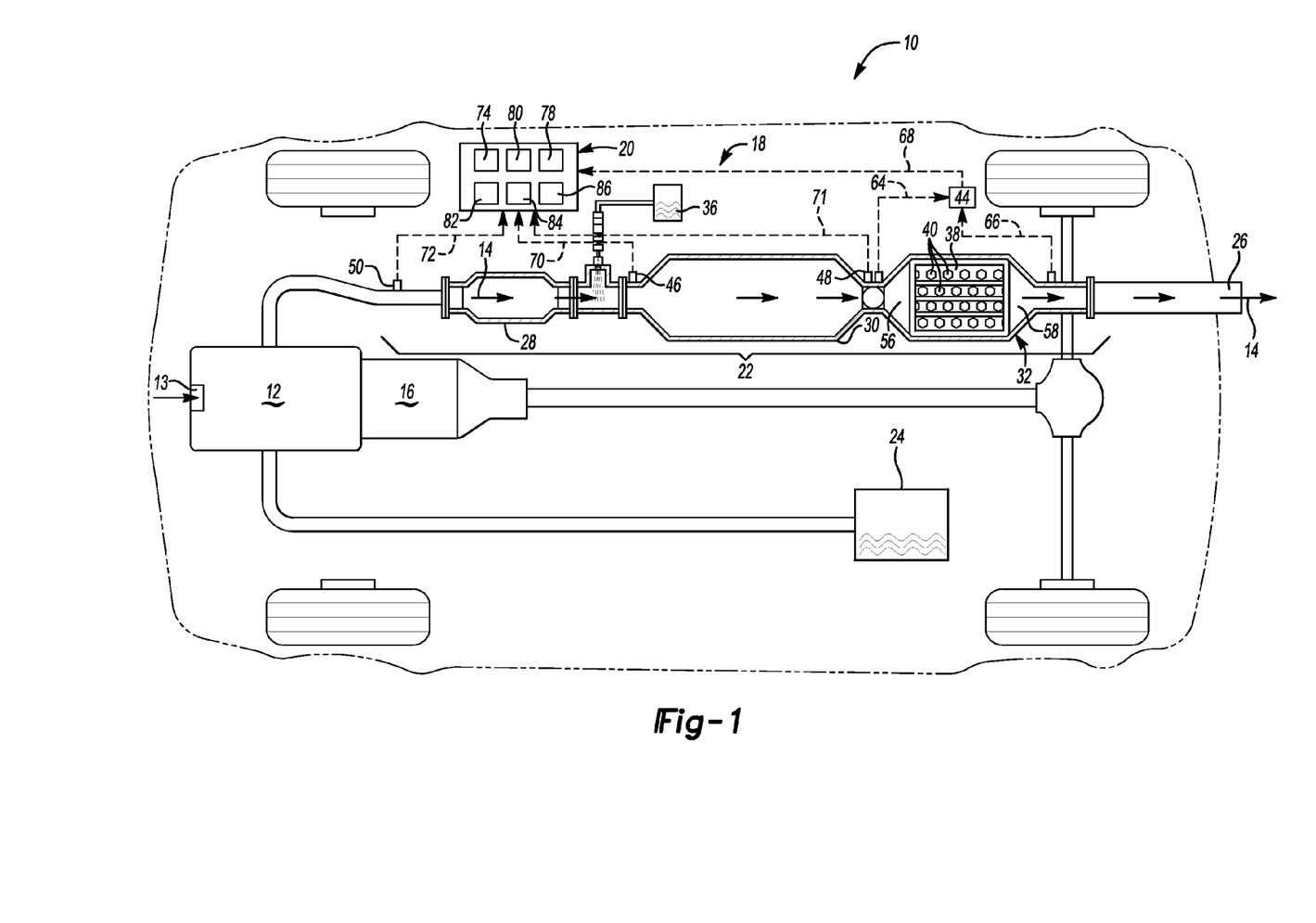
FIG. 1 is a schematic illustration of a vehicle with an engine and an exhaust gas system, the exhaust gas system having a stand-alone particulate filter.

Referring to the drawings, wherein like reference numerals refer to like components throughout the several views, FIG. 1 schematically depicts a vehicle 10. The vehicle 10 includes an internal combustion engine 12 having an air intake 13. The engine 12 generates an exhaust gas stream 14. The vehicle 10 further includes a transmission 16, an exhaust gas after-treatment system 22 for treating constituents in the exhaust gas stream 14, and a monitoring system 18 having a controller 20. The controller 20 is configured, i.e., programmed and equipped in hardware, to regulate and coordinate the functions of various components of the vehicle 10. While a diesel application is described hereinafter for illustrative consistency, those of ordinary skill in the art will appreciate that a similar approach may be taken with respect to other engine designs regardless of the configuration or design of the engine 12.

Figure 2:
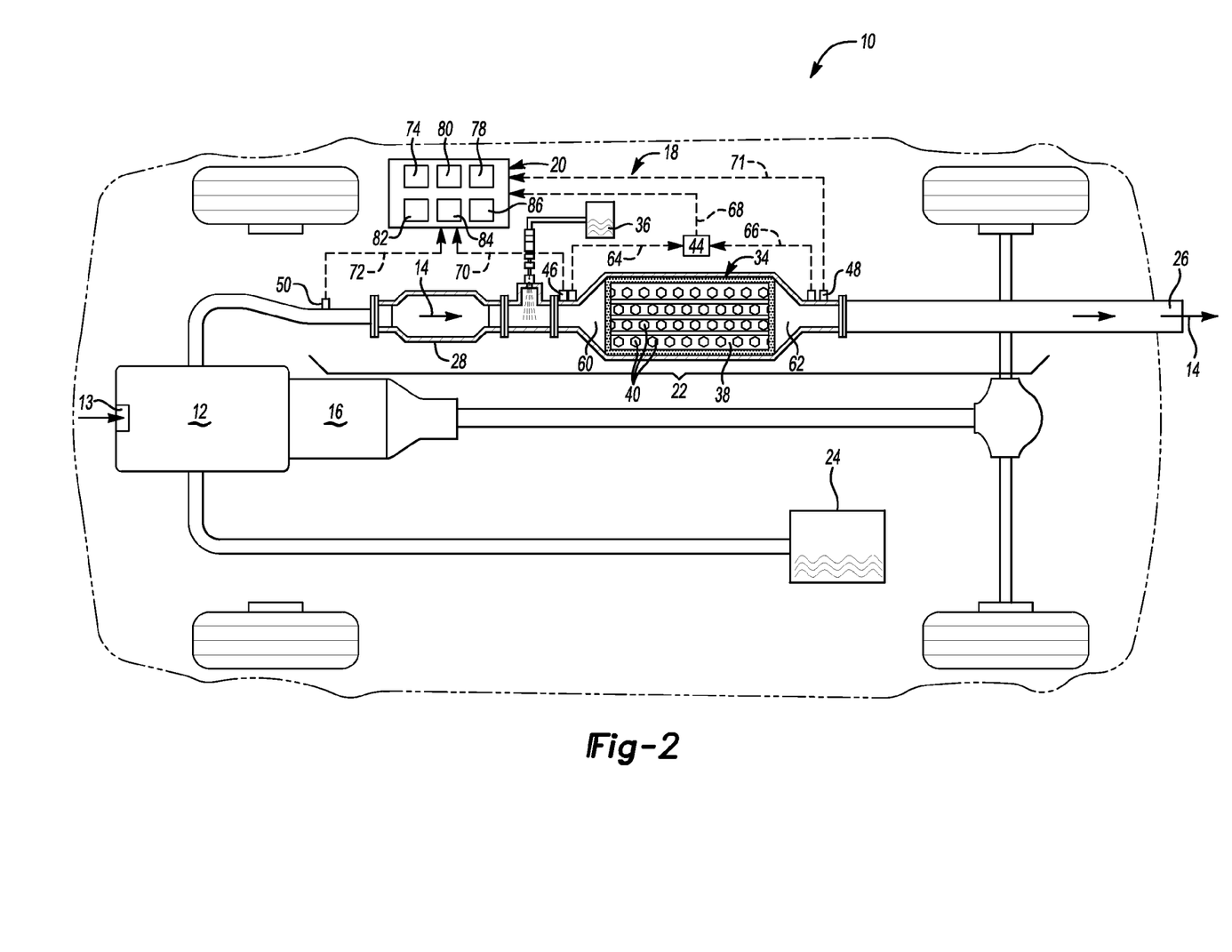
FIG. 2 is a schematic illustration of a vehicle with an engine and an exhaust gas system, the exhaust gas system having a Selective Catalytic Reduction Filter (SCRF)

As shown in FIGS. 1 and 2, aboard the vehicle 10, combustion of fuel drawn from a fuel storage tank 24 generates the exhaust gas stream 14, which is then processed through the exhaust gas system 22 before discharge from a tailpipe 26. The exhaust gas stream 14 is emitted from the engine 12 as a by-product of combustion. The exhaust gas system 22 may include a series of exhaust after-treatment devices 28, 30, 32, 34. The exhaust after treatment devices may include a diesel oxidation catalyst (DOC) 28, a selective catalyst reduction device (SCR) device 30, 34 and a particulate filter 32, 34. The SCR device 30, 34 and particulate filter 32, 34 may be two stand-alone devices, i.e., an SCR device 30 and a particulate filter 32, or may be combined into one combined particulate filter component with selective catalytic reduction capabilities; such a structure is defined as a Selective Catalytic Reduction Filter (SCRF) 34.

As shown in FIG. 1, the exhaust gas system 22 includes a DOC 28, an SCR device 30, and a stand-alone particulate filter 32. As shown in FIG. 2, the exhaust gas system 22 includes a DOC 28 and an SCRF 34.

Generally, the exhaust gas system 22 includes a passage for directing the exhaust gas stream 14 from the engine 12 through the series of exhaust gas after-treatment devices 28, 30, 32, 34. Depending on the embodiment, the after-treatment devices 28, 30, 32, 34 of the exhaust gas system 22 may be arranged in any desired order. Collectively, exhaust gas after-treatment devices, i.e., the combination of the DOC 28, the SCR device 30, and the stand-alone particulate filter 32 (shown in FIG. 1) and the combination of the DOC 28 and the SCRF 34 (shown in FIG. 2) condition the exhaust gas stream (arrow 14).

The exhaust after-treatment devices 28, 30, 32, 34 are employed to reduce various exhaust emissions of the engine 12. In particular, the DOC 28 is adapted to receive the exhaust gas stream 14 from the engine 12 to oxidize and burn hydrocarbons present in the exhaust gas stream 14.

Referring specifically to FIG. 1, the SCR device 30 is configured to catalytically convert nitrogen oxide ($NO_x$) gases present in the exhaust gas stream 14 into water and nitrogen. The SCR device 30 may include an active catalytic component, which can be an oxide of a base metal such as one of vanadium, molybdenum, tungsten, and zeolite. As such, the SCR device 30 converts $NO_x$ gases into inert byproducts, i.e., diatomic nitrogen $N_2$, and water $H_2O$, with the aid of a reductant 36.

The reductant 36 can be an anhydrous ammonia, aqueous ammonia, ammonia precursors, aqueous solution of urea or any other suitable reductant 36, which is added to the exhaust gas stream 14 and absorbed in the SCR device 30. Accordingly, the reductant 36 accesses the SCR device 30 as the exhaust gas stream 14 flows through SCR device 30. As the exhaust gas stream 14 passes through the SCR device 30, the reducant 36 interacts with the exhaust gas stream 14 via a chemical reaction, to reduce $NO_x$ gases present in the exhaust gas stream 14 as it passes through the exhaust gas system 22.

The stand-alone particulate filter 32 may be configured to filter particulate matter, i.e., soot, from the exhaust gas stream 14 of the engine 12. The stand-alone particulate filter 32 may include a substrate 38 that defines a plurality of apertures 40 therein, through which the exhaust gas stream 14 flows. As the exhaust gas stream 14 passes through the stand-alone particulate filter 32, suspended airborne particulate matter may collect on the substrate 38, where it may be separated from the exhaust gas stream 14; this process is defined as soot loading.

Referring specifically to FIG. 2, the SCRF 34 is a particulate filter with selective catalytic reduction capabilities and is designed to perform functions of each of the SCR device 30 and the stand-alone particulate filter 32 described hereinabove and shown in FIG. 1. The SCRF 34 is employed for 1) treating noxious emissions contained in an exhaust gas stream 14 of the engine 12; and 2) filtering particulate matter, i.e. soot, from the exhaust gas stream 14. Simply stated, SCRF 34 is utilized to reduce NOx emissions and filter particulate matter expelled from the engine 12 powering the vehicle 10.

The SCRF 34 converts $NO_x$ gases into inert byproducts, i.e., diatomic nitrogen ($N_2$), and water ($H_2O$), with the aid of the reductant 36, which is added to the exhaust stream (shown at arrow 14) and absorbed in the SCRF 34 as the exhaust gas stream 14 flows through the SCRF 34.

Further, the SCRF 34 may include a substrate 38 that define a plurality of apertures 40 therein, through which the exhaust gas stream 14 flows. After the exhaust gas stream is treated with the reductant 36, suspended airborne particulate matter from the engine 12 present in the exhaust gas stream 14 may collect on the substrate 38, where it may be separated from the exhaust stream 14, i.e., soot loading.

Referring generally to FIGS. 1 and 2, over the life of the vehicle 10, the particulate filter 32, 34 (combined SCRF 34 or a stand-alone particulate filter 32) depending upon the embodiment, may occasionally need to be regenerated to remove particulate matter collected on the substrate 38. Regeneration of the particulate filter 32, 34 is performed during a specified regeneration event, which includes heating the particulate filter 32, 34 to a temperature sufficient to burn the collected particulate matter or soot, which converts the particulate matter to carbon dioxide. A particulate filter regeneration event is commonly dictated by the presence of an estimated amount of soot accumulated in the particulate filter 32, 34, which is in excess of a predetermined threshold amount of soot allowable in the particulate filter 32, 34. As such, for example, the particulate filter 32, 34 collects sooty particulate matter during a soot loading phase and disposes of the sooty particulate matter through the regeneration process.

The monitoring system 18 may be employed to monitor various real-time operating parameters of the flow of the exhaust gas stream 14 (exhaust flow). The monitoring system 18 may include a controller 20 configured, i.e., programmed and equipped in hardware, to evaluate the exhaust gas system 22 and the several operating parameters thereof. For example, the controller 20 may evaluate a flow impedance of the particulate filter 32, 34 by monitoring a differential pressure module 44. Additionally, the controller 20 may be configured to monitor one or more nitrogen oxide sensors 46, 48 and/or one or more temperature sensors 50 that may be in fluid communication with the exhaust gas stream 14.

The nitrogen oxide sensors 46, 48 may be configured to measure the mass flow rate of nitrogen oxides present in the exhaust gas stream 14. The nitrogen oxide sensors 46, 48 may then provide a $NO_x$ signal 70, 71 to the controller 20 that corresponds to this measured quantity.

The temperature sensor 50 may be disposed upstream of the particulate filter 32, 34 and may be configured to measure the temperature of the exhaust flow 14 entering the particulate filter 32, 34. The temperature sensor 50 may provide a temperature signal 72 to the controller 20 corresponding to this monitored value. A second temperature sensor (not shown) may be disposed downstream of the particulate filter 32, 34, and may similarly be used to measure the temperature of the exhaust flow 14 following filtration.

The differential pressure module 44, may be a single sensor capable of returning a resultant $\Delta P$ measurement to the controller 20 such as an electronic pressure sensor, and may include a piezoresistive sensor, a piezoelectric sensor, a MEMS sensor, and/or capacitive sensor configured to convert a sensed pressure into an analog or digital signal representative of the sensed pressure.

The differential pressure module 44 may monitor the measured differential pressure ($\Delta P$) of the particulate filter 32, 34, wherein the measured differential pressure ($\Delta P$) is the instantaneous pressure drop across the particulate filter 32, 34. The differential pressure module 44 may monitor the instantaneous pressure drop across the filter 32, 34 or the differential pressure ($\Delta P$), via pressure readings. The differential pressure module 44 may be configured to determine the difference between the first pressure reading 64 and the second pressure reading 66 and generate a differential pressure output 68 corresponding to the exhaust gas pressure drop ($\Delta P$) across the particulate filter 32, 34.

In one configuration, shown in FIG. 1, a first pressure reading 64 may be taken at an inlet side 56 of the stand-alone particulate filter 32 between the particulate filter 32 and the SCR device 30 and a second pressure reading 66 may be taken at an outlet side 58 of the particulate filter 32.

In another configuration, shown in FIG. 2, the first pressure reading 64 may be taken at the inlet side 60 of the SCRF 34 between the DOC 28 and the SCRF 34 and a second reading 66 may be taken at an outlet side 62 of the SCRF 34.

Referring back to the controller 20 described herein above, the controller 20 may be a stand-alone unit, or be part of an electronic controller that regulates the operation of the engine 12. The controller 20 may be embodied as a server/host machine or distributed system, e.g., a digital computer or microcomputer, acting as a vehicle control module, and/or as a proportional-integral-derivative (PID) controller device having a processor, and tangible, non-transitory memory such as read-only memory (ROM) or flash memory. The controller 20 may also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

Therefore, the controller 20 can include all software, hardware, memory, algorithms, connections, sensors, etc., necessary to monitor and control the exhaust gas system 22 and the engine 12.

In general, computing systems and/or devices, such as the controller 20, may employ any of a number of computer operating systems and generally include computer-executable instructions, where the instructions may be executable by one or more computing devices such as those listed above. Computer-executable instructions may be compiled or interpreted from computer programs created using a variety of well-known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

In general, the controller 20 may use the differential pressure output 68, $NO_x$ flow rate (measured via the $NO_x$ signals 70, 71), monitored temperature 72, engine speed, and engine load to estimate the status/capacity of the particulate filter 32, 34. As will be described in greater detail below, a soot model 74 may utilize the estimate of the number of grams of soot collected within the particulate filter 32, 34 to determine the need for a particulate filter regeneration event to burn off the collected soot within the particulate filter 32, 34.

The controller 20 may be configured to execute the present method 100 to determine an estimated amount of soot accumulated in the particulate filter 32, 34 in both steady-state and transient-state driving conditions, in order to timely initiate regeneration events.

Figure 3:
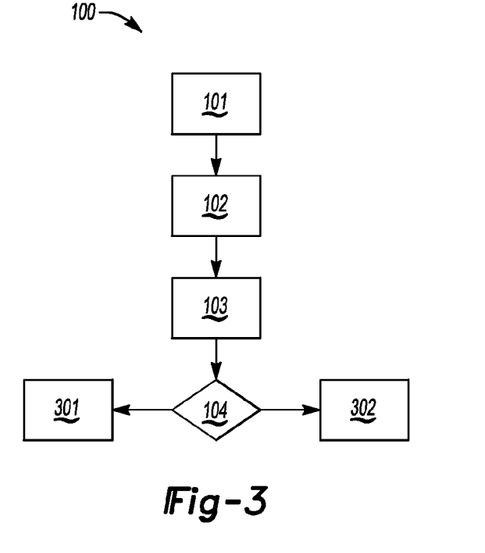
FIG. 3 is a flow diagram describing an example method of estimating an amount of soot accumulated in a particulate filter of an exhaust gas system.

As shown in FIG. 3, the present method 100 of determining an estimated amount of soot accumulated in a particulate filter 32, 34 in both steady-state and transient-state driving conditions may include four steps. Simply stated, the present method 100 allows for an estimate of soot accumulated with improved accuracy. At step 101, the controller 20 evaluates the instantaneous volumetric flow rate of the exhaust gas stream 14 flowing through the exhaust gas system 22. The volumetric flow rate of the exhaust gas stream 14 may be calculated or measured as a function of the exhaust temperature 72 and the combined air flow and fuel flow passing through the exhaust gas system 22. Simply stated, the volumetric flow rate is equal to the volume of exhaust gas passing through the exhaust gas system 22 over a specified time interval, at the signaled exhaust gas temperature 72.

At step 102, the differential pressure module 44 monitors the exhaust gas pressure drop across the particulate filter 32, 34 and returns a differential pressure output 68 to the controller 20.

Figure 4:
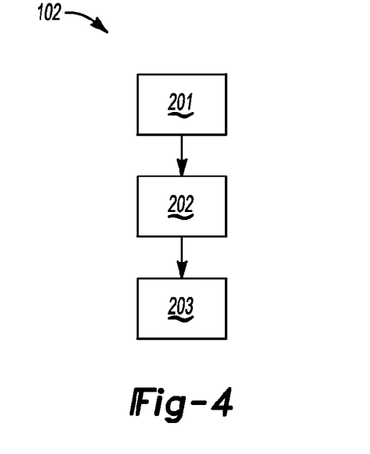
FIG. 4 is a flow diagram detailing the process of monitoring the exhaust gas pressure drop across the particulate filter.

Step 102, monitoring the exhaust gas pressure drop across the particulate filter 32, 34, is further detailed in the flow diagram shown in FIG. 4. Monitoring the exhaust gas pressure drop across the particulate filter 32, 34 may include three steps. At step 201, the differential pressure module 44 obtains the first pressure reading 64 from an inlet side 56, 60 of the particulate filter 32, 34. At step 202, the differential pressure module 44 obtains the second pressure reading 66 from the outlet side 58, 62 of the particulate filter 32, 34. At step 203, the differential pressure module 44 determines the difference between the first pressure reading 64 and the second pressure reading 66 and generates the differential pressure output 68, i.e., ΔP, corresponding to the pressure drop across the particulate filter 32, 34.

Referring back to FIG. 3, at step 103, the controller 20 determines the drive state of the vehicle 10 based on the volumetric flow rate of the exhaust gas stream 14 and the exhaust gas pressure drop or differential pressure output 68 across the particulate filter 32, 34. The drive state is one of a steady-state drive state and a transient-state drive state. A steady-state drive state is a drive state such as the drive state experienced during highway driving or other constant speed, non stop-and-go cycles. A transient-state drive state is a drive state wherein variables such as vehicle speed, engine load, engine speed, and volumetric flow rate of the exhaust gas stream 14 are in flux, such as during city driving and in stop-and-go cycles.

At step 104, the controller 20, executes one of a first control action 301 when the drive state is a steady-state drive state and a second control action 302 when the drive state is a transient-state drive state.

Figure 5:
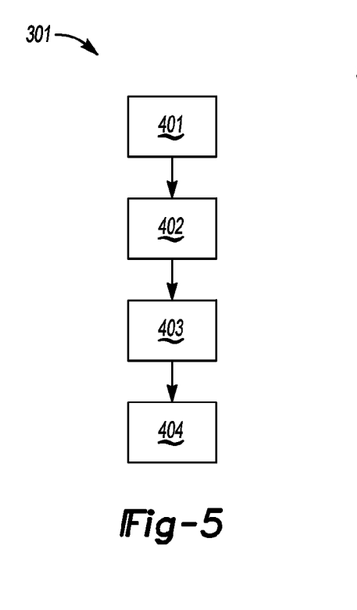
FIG. 5 is a flow diagram describing a first control action.

Referring to FIG. 5, the controller 20 executes a first control action 301 when the drive state is determined to be a steady-state drive state. A steady-state drive state is indicated when the differential pressure output 68 and volumetric flow rate of the exhaust gas 14 are each indicative of a vehicle at a constant speed, i.e., a relatively high engine speed and engine load. Most notably, there is a lack of a distinct user input request for an increased engine speed.

By the execution of the first control action 301, at steps 401 and 402, the controller 20 estimates the amount of soot accumulated in the particulate filter 32, 34 as a function of the resistance flow rate of the exhaust gas stream 14 across the particulate filter 32, 34. At step 401, the resistance flow rate of the exhaust gas 14 across the particulate filter 32, 34 is calculated as a function of the volumetric flow rate of the exhaust gas stream 14 and the differential pressure output 68. The resistance flow rate of the exhaust gas stream 14 across the particulate filter 32, 34 is defined as the differential pressure output 68 divided by the instantaneous volumetric flow rate of the exhaust gas stream 14.

At step 402, the controller 20 determines an estimated amount of soot accumulated in the particulate filter 32, 34 based on the resistance flow rate of the exhaust gas stream 14. The estimated amount of soot accumulated in the particulate filter 32, 34 is determined via the use of a first look-up table 78, wherein the first look-up table 78 is written on the tangible non-transitory memory of the controller 20. The first look-up table 78 is further defined as a two-dimensional look-up table of predetermined calibrated values, such that the first look-up table 78 expresses the estimated amount of soot accumulated in the particulate filter 32, 34 as a function of the calculated resistance flow rate of the exhaust gas 14.

At step 403, the controller 20, via the soot model 74, compares the estimated amount of soot accumulated in the particulate filter, obtained from the first look-up table 78 to a predetermined threshold amount of soot allowable 80 in the particulate filter 32, 34. The predetermined amount of soot allowable 80 in the particulate filter 32, 34 is a predetermined calibrated amount written on the tangible non-transitory memory of the controller 20.

At step 404, the controller 20 initiates a regeneration event of the particulate filter 32, 34 if the soot model 74 indicates that the estimated amount of soot accumulated in the particulate filter 32, 34 is greater than the predetermined threshold amount of soot allowable 80 in the particulate filter 32, 34.

Figure 6:
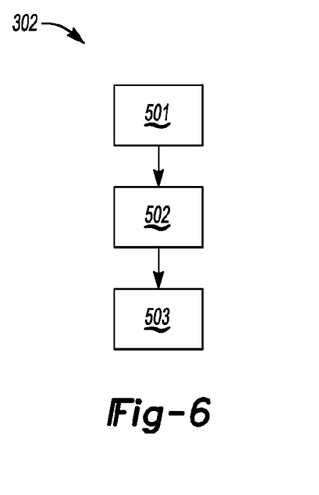
FIG. 6 is a flow diagram describing a second control action.

Referring to FIG. 6, the controller 20 executes a second control action 302 when the drive state is determined to be a transient-state drive state. A transient-state drive state is indicated by a user request dictating a sudden increase in engine 12 speed, such as at throttle "tip-in" in stop-and-go cycles. In such instances, the differential pressure output 68 is indicative of a vehicle 10 at idle or at a low engine load or low engine speed; however, due to the user input request for an increased engine speed, the volumetric flow rate of the exhaust gas stream 14 increases significantly as engine speed and volumetric flow rate of the exhaust gas stream 14 are proportional. This inconsistency is due to a time lag as the intake air moves from the air intake 13 through the exhaust system 22 to the particulate filter 32, 34. Therefore, due to a differential pressure output 68 indicative of the vehicle 10 being at idle and an instantaneous volumetric flow rate of the exhaust gas stream 14 indicative of the vehicle 10 accelerating, the calculated resistance flow rate of the exhaust gas 14 experiences severe spikes, in stop-and-go and other transient drive state cycles. These spikes in resistance flow rate of the exhaust gas stream 14 across the particulate filter 32, 34 generally indicate a high level of estimated soot accumulated and/or a sudden increase in the amount of estimated soot accumulated in the particulate filter 32, 34 and, in turn, cause the soot model 74 to trigger the premature initiation of a regeneration event of the particulate filter 32, 34. Such premature regeneration of the particulate filter 32, 34 can decrease fuel economy of the vehicle 10. As such, in a transient-state drive state, i.e., a stop-and-go cycle, accuracy of the determination of the estimated amount of soot accumulated in the particulate filter 32, 34 can be enhanced and fuel economy of the vehicle 10 improved if calculated via the second control action 302.

At step 501, the controller 20 determines an estimated amount of soot accumulated in the particulate filter 32, 34 based on the differential pressure output 68 and the volumetric flow rate of the exhaust gas stream 14. Determining the estimated amount of soot accumulated in the particulate filter 32, 34 includes selecting an amount of soot accumulated in the particulate filter 32, 34 from a second look-up table 82. The second look-up table 82 is written on the tangible, non-transitory memory of the controller 20. The second look-up table 82 may be embodied as a two dimensional look-up table expressing the estimated amount of soot accumulated in the particulate filter 32, 34 as a function of a first evaluation element 84.

Figure 7:
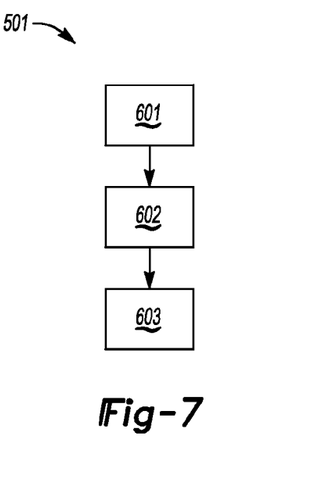
FIG. 7 is a flow diagram detailing the process of selecting an amount of soot accumulated in the particulate filter from a second look-up table.

As shown in FIG. 7, selecting an amount of soot accumulated in the particulate filter 32, 34 from a second look-up table 82 includes three steps. At step 601, the controller 20 analyzes the relationship between the differential pressure output 68 and the instantaneous volumetric flow rate of the exhaust gas stream 14 over a first time period. The relationship between the differential pressure output 68 and the instantaneous volumetric flow rate of the exhaust gas stream 14 over a first time period is defined as a linear regression or line of best fit of the differential pressure output 68 plotted against the instantaneous volumetric flow rate, wherein the line of best fit has a slope. At step 602 the controller 20 calculates the slope of the linear regression or line of best fit, fitted to the evaluated differential pressure output 68 values plotted against the instantaneous volumetric flow rate values analyzed over the first time period.

The first evaluation element 84 is defined as the slope of the linear regression or line of best fit, fitted to the evaluated differential pressure output 68 values and instantaneous volumetric flow rate values analyzed over the first time period.

At step 603, the controller 20 compares the first evaluation element 84 to prerecorded slope values in the second look-up table 82, obtained by testing, at known, predetermined, calibrated amounts of soot accumulated in the particulate filter 32, 34.

Simply stated, at step 501, the controller 20 performs a backwards calculation of the estimated amount of soot accumulated in the particulate filter 32, 34 by evaluating a series of corresponding differential pressure output 68 values and instantaneous volumetric flow rates of the exhaust gas stream 14 over a first time period, utilizing a linear regression model 86 to determine a line of best fit for the corresponding differential pressure output 68 values plotted against instantaneous values of volumetric flow rate of the exhaust gas stream 14. The controller 20 then determines the slope of the line of best fit or the linear regression, i.e., generates the first evaluation element 84. The first evaluation element 84 is then entered into the second look-up table 82 to yield a corresponding estimated amount of soot accumulated in the particulate filter 32, 34.

Referring back to FIG. 6, at step 502, the controller 20, via the soot model 74, compares the estimated amount of soot accumulated in the particulate filter 32, 34, obtained from the second look-up table 82 to a predetermined threshold amount of soot allowable 80 in the particulate filter 32, 34. The predetermined amount of soot allowable 80 in the particulate filter 32, 34 is a predetermined calibrated amount written on the tangible non-transitory memory of the controller 20.

At step 503, the controller 20 initiates a regeneration event of the particulate filter 32, 34 if the soot model 74 indicates that the estimated amount of soot accumulated in the particulate filter 32, 34 is greater than the predetermined threshold amount of soot allowable 80 in the particulate filter 32, 34.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of determining an estimated amount of soot accumulated in a particulate filter of a vehicle exhaust gas system comprising:

evaluating, via a controller, an instantaneous volumetric flow rate of an exhaust gas flowing through the exhaust gas system;

monitoring, via a differential pressure module, an exhaust gas pressure drop across the particulate filter and returning a differential pressure output to the controller; determining, via the controller, a drive state of the vehicle based on the instantaneous volumetric flow rate of the exhaust gas and the exhaust gas pressure drop across the particulate filter, wherein the drive state is one of a steady-state drive state and a transient-state drive state;

executing, via the controller, a first control action when the drive state is the steady-state drive state and executing, via the controller, a second control action when the drive state is the transient-state drive state, wherein:

the first control action includes:
calculating a resistance flow rate of the exhaust gas across the particulate filter based on the instantaneous volumetric flow rate of the exhaust gas and the differential pressure output; and
determining an estimated amount of soot accumulated in the particulate filter based on the resistance flow rate of the exhaust gas; and the second control action includes determining an estimated amount of soot accumulated in the particulate filter based on the differential pressure output and the instantaneous volumetric flow rate of the exhaust gas, such that determining the estimated amount of soot accumulated in the particulate filter includes:
analyzing a relationship between the differential pressure output and the instantaneous volumetric flow rate of the exhaust gas over a first time period, wherein the relationship between the differential pressure output and the instantaneous volumetric flow rate of the exhaust gas over a first time period is defined as a linear regression having a slope;
calculating the slope of the linear regression;
selecting an estimated amount of soot accumulated in the particulate filter from a second look-up table, such that the second look-up table is a two dimensional look-up table expressing the estimated amount of soot accumulated in the particulate filter as a function of the slope of the linear regression;

comparing, via the controller, the estimated amount of soot accumulated in the particulate filter to a predetermined threshold amount of soot allowable in the particulate filter; and initiating a regeneration event of the particulate filter, via the controller, when the estimated amount of soot accumulated in the particulate filter is greater than the predetermined threshold amount of soot allowable in the particulate filter, wherein the regeneration event includes heating the particulate filter to a temperature sufficient to burn collected particulate matter or soot which converts the particulate matter to carbon dioxide.

2. The method of claim 1 wherein monitoring an exhaust gas pressure drop across the particulate filter includes:
obtaining, with the differential pressure module, a first pressure reading at an inlet side of the particulate filter, wherein the inlet side of the particulate filter is between the particulate filter and an engine;
obtaining, with the differential pressure module, a second pressure reading at an outlet side of the particulate filter; and
determining a difference between the first pressure reading and the second pressure reading, via the differential pressure module, such that the differential pressure module generates the differential pressure output corresponding to a pressure drop between the inlet side of the particulate filter and the outlet side of the particulate filter.

3. The method of claim 1 wherein determining the estimated amount of soot accumulated in the particulate filter based on the resistance flow rate of the exhaust gas in the first control action includes selecting an estimated amount of soot accumulated in the particulate filter from a first look-up table, and wherein the first look-up table is a two dimensional look-up table expressing the estimated amount of soot accumulated in the particulate filter as a function of the resistance flow rate of the exhaust gas.

4. A vehicle comprising:
an engine that generates an exhaust gas stream;
an exhaust gas system in fluid communication with the engine, the exhaust gas system having a plurality of exhaust after-treatment devices including:
a diesel oxidation catalyst adapted to receive the exhaust gas stream from the engine and to oxidize and burn hydrocarbons present in the exhaust gas steam;
a selective catalyst reduction device configured to catalytically convert nitrogen oxide ($NO_x$) gases present in the exhaust gas stream into water and nitrogen; and
a stand-alone particulate filter configured to remove particulate matter from the exhaust gas stream; and
a controller, having a processor and tangible, non-transitory memory on which is recorded instructions, wherein executing the recorded instructions causes the processor to:
evaluate an instantaneous volumetric flow rate of the exhaust gas stream flowing through the exhaust gas system;
determine a differential pressure output as an exhaust gas pressure drop across the stand-alone particulate filter;
determine a drive state of the vehicle based on the instantaneous volumetric flow rate of the exhaust gas stream and the differential pressure output, wherein the drive state is one of a steady-state drive state and a transient-state drive state;
execute a first control action when the drive state is the steady-state drive state and execute a second control action when the drive state is the transient-state drive state, wherein:
the first control action includes:
calculating a resistance flow rate of the exhaust gas across the stand-alone particulate filter based on the instantaneous volumetric flow rate of the exhaust gas and the differential pressure output; and
determining an estimated amount of soot accumulated in the stand-alone particulate filter based on the resistance flow rate of the exhaust gas; and
the second control action includes determining an estimated amount of soot accumulated in the stand-alone particulate filter based on the differential pressure output and the instantaneous volumetric flow rate of the exhaust gas, such that determining the estimated amount of soot accumulated in the stand-alone particulate filter includes:
analyzing a relationship between the differential pressure output and the instantaneous volumetric flow rate of the exhaust gas over a first time period, wherein the relationship between the differential pressure output and the instantaneous volumetric flow rate of the exhaust gas over a first time period is defined as a linear regression having a slope;
calculating the slope of the linear regression;
selecting an estimated amount of soot accumulated in the stand-alone particulate filter from a second look-up table, such that the second look-up table is a two dimensional look-up table expressing the estimated amount of soot accumulated in the stand-alone particulate filter as a function of the slope of the linear regression;

compare the estimated amount of soot accumulated in the stand-alone particulate filter to a predetermined threshold amount of soot allowable in the stand-alone particulate filter; and initiate a regeneration event of the stand-alone particulate filter when the estimated amount of soot accumulated in the stand-alone particulate filter is greater than the predetermined threshold amount of soot allowable in the stand-alone particulate filter, wherein the regeneration event includes heating the particulate filter to a temperature sufficient to burn collected particulate matter or soot which converts the particulate matter to carbon dioxide.

5. The vehicle of claim 4 further comprising:
a differential pressure module configured to generate the differential pressure output as a value corresponding to an exhaust gas pressure drop across the stand-alone particulate filter.

6. The vehicle of claim 5 wherein determining a differential pressure output as an exhaust gas pressure drop across the stand-alone particulate filter includes:

obtaining, with the differential pressure module, a first pressure reading at an inlet side of the stand-alone particulate filter, wherein the inlet side of the stand-alone particulate filter is between the stand-alone particulate filter and an engine;

obtaining, with the differential pressure module, a second pressure reading at an outlet side of the stand-alone particulate filter; and determining a difference between the first pressure reading and the second pressure reading, via the differential pressure module, such that the differential pressure module generates the differential pressure output corresponding to a pressure drop between the inlet side of the stand-alone particulate filter and the outlet side of the stand-alone particulate filter.

7. The vehicle of claim 4 wherein determining the estimated amount of soot accumulated in the stand-alone particulate filter based on the resistance flow rate of the exhaust gas within the first control action includes selecting an amount of soot accumulated in the stand-alone particulate filter from a first look-up table configured as a two dimensional look-up table expressing the estimated amount of soot accumulated in the stand-alone particulate filter as a function of the calculated resistance flow rate of the exhaust stream.

8. A vehicle comprising:
an engine that generates an exhaust gas stream;
an exhaust gas system in fluid communication with the engine, the exhaust gas system having a plurality of exhaust after-treatment devices including:
a diesel oxidation catalyst adapted to receive the exhaust gas stream from the engine and to oxidize and burn hydrocarbons present in the exhaust gas steam; and
a selective catalyst reduction filter (SCRF) configured to catalytically convert NOx gases present in the exhaust gas stream into water and nitrogen and remove particulate matter from the exhaust gas stream; and
a controller, having a processor and tangible, non-transitory memory on which is recorded instructions, wherein executing the recorded instructions causes the processor to:
evaluate an instantaneous volumetric flow rate of the exhaust gas stream flowing through the exhaust gas system;

determine a differential pressure output as an exhaust gas pressure drop across the selective catalyst reduction filter;

determine a drive state of the vehicle based on the instantaneous volumetric flow rate of the exhaust gas stream and the differential pressure output, wherein the drive state is one of a steady-state drive state and a transient-state drive state;

execute a first control action when the drive state is the steady-state drive state and execute a second control action when the drive state is the transient-state drive state, wherein:

the first control action includes:
calculating a resistance flow rate of the exhaust gas across the selective catalyst reduction filter based on the instantaneous volumetric flow rate of the exhaust gas and the differential pressure output; and
determining an estimated amount of soot accumulated in the selective catalyst reduction filter based on the resistance flow rate of the exhaust gas;

the second control action includes determining an estimated amount of soot accumulated in the selective catalyst reduction filter based on the differential pressure output and the instantaneous volumetric flow rate of the exhaust gas, such that determining the estimated amount of soot accumulated in the selective catalyst reduction filter includes:
analyzing a relationship between the differential pressure output and the instantaneous volumetric flow rate of the exhaust gas over a first time period, wherein the relationship between the differential pressure output and the instantaneous volumetric flow rate of the exhaust gas over a first time period is defined as a linear regression having a slope;
calculating the slope of the linear regression; and
selecting an estimated amount of soot accumulated in the selective catalyst reduction filter from a second look-up table, such that the second look-up table is a two dimensional look-up table expressing the estimated amount of soot accumulated in the selective catalyst reduction filter as a function of the slope of the linear regression;

compare the estimated amount of soot accumulated in the selective catalyst reduction filter to a predetermined threshold amount of soot allowable in the selective catalyst reduction filter; and initiate a regeneration event of the selective catalyst reduction filter when the estimated amount of soot accumulated in the selective catalyst reduction filter is greater than the predetermined threshold amount of soot allowable in the selective catalyst reduction filter, wherein the regeneration event includes heating the particulate filter to a temperature sufficient to burn collected particulate matter or soot which converts the particulate matter to carbon dioxide.

9. The vehicle of claim 8 further comprising:
a differential pressure module configured to generate the differential pressure output as a value corresponding to an exhaust gas pressure drop across the selective catalyst reduction filter.

10. The vehicle of claim 9 wherein determining a differential pressure output as an exhaust gas pressure drop across the selective catalytic reduction filter includes:

obtaining, with the differential pressure module, a first pressure reading at an inlet side of the selective catalytic reduction filter, wherein the inlet side of the selective catalytic reduction filter is between the selective catalytic reduction filter and an engine;

obtaining, with the differential pressure module, a second pressure reading at an outlet side of the selective catalytic reduction filter; and determining a difference between the first pressure reading and the second pressure reading, via the differential pressure module, such that the differential pressure module generates the differential pressure output corresponding to a pressure drop between the inlet side of the selective catalytic reduction filter and the outlet side of the selective catalytic reduction filter.

11. The vehicle of claim 8 wherein determining the estimated amount of soot accumulated in the particulate filter based on the resistance flow rate of the exhaust gas within the first control action includes selecting an amount of soot accumulated in the selective catalyst reduction filter from a first look-up table configured as a two dimensional look-up table expressing the estimated amount of soot accumulated in the selective catalyst reduction filter as a function of the calculated resistance flow rate of the exhaust stream.

* * * * *